J. GRABB.
HORSESHOE.
APPLICATION FILED JAN. 16, 1911.
993,055.
Patented May 23, 1911.
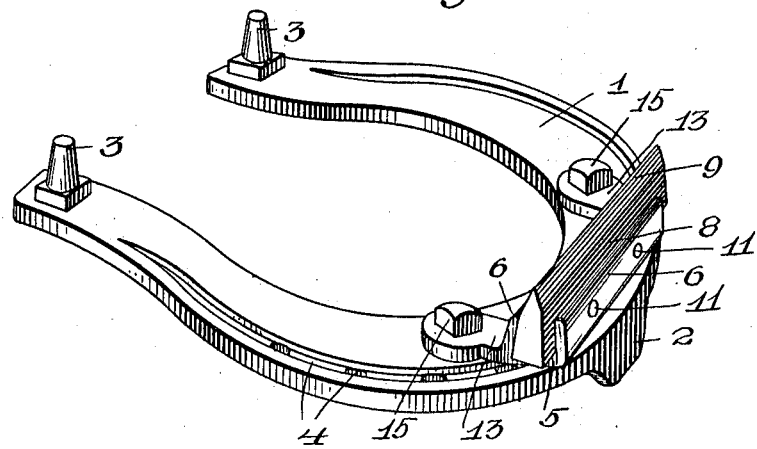
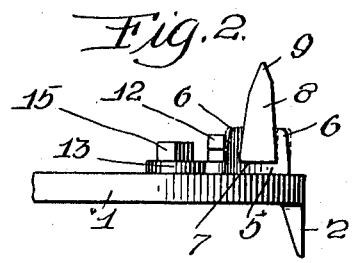
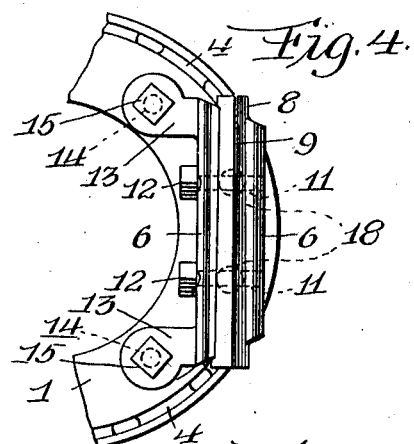
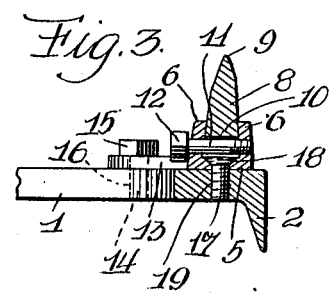
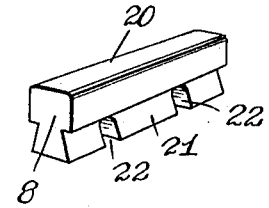
WITNESSES
INVENTOR
Jacob Grabb,
by Attorneys.

UNITED STATES PATENT OFFICE.

JACOB GRABB, OF SHARPSBURG, PENNSYLVANIA.

HORSESHOE.

993,055.  Specification of Letters Patent.  Patented May 23, 1911.

Application filed January 16, 1911. Serial No. 602,869.

*To all whom it may concern:*

Be it known that I, JACOB GRABB, a citizen of the United States of America, residing at Sharpsburg, in the county of Allegheny and State of Pennsylvania, have invented certain new and useful Improvements in Horseshoes, of which the following is a specification, reference being had therein to the accompanying drawing.

This invention relates to horseshoes, and the objects of my invention are to furnish a horseshoe with a detachable toe calk that can be easily and quickly removed, sharpened or renewed, and to provide a toe calk for horseshoes that will prevent horses or mules from slipping upon wet, frozen and irregular surfaces.

Further objects of the invention are to furnish a horseshoe with a holder for various kinds of calks, and to accomplish the above results by a calk and calk holder that are simple in construction, durable, easy to install, inexpensive to manufacture, applicable to various types of horseshoes and highly efficient for the purposes for which they are intended.

With the above and such other objects in view as may hereinafter appear, the invention consists of the novel construction, combination and arrangement of parts to be hereinafter specifically described and then claimed.

Reference will now be had to the drawing, wherein like numerals of reference designate corresponding parts throughout the several views of the drawing, in which:—

Figure 1 is a perspective view of an inverted horseshoe provided with the holder and calk in accordance with this invention, Fig. 2 is a side elevation of the holder and calk as applied to a portion of a shoe, Fig. 3 is a cross sectional view of the same, Fig. 4 is a plan of the same, and Fig. 5 is a perspective view of a calk designed for use in the summer time.

The reference numeral 1 denotes a horseshoe having the ordinary toe piece 2, heel calks 3 and a nail groove and openings 4.

5 denotes a bottom plate having longitudinal yieldable or resilient vertical walls 6 providing a tapering dove-tailed groove 7 adapted to receive the lower dove-tailed edge of a calk 8. The groove 7 tapers from one end of the plate to the opposite end thereof and into this groove the calk 8 is driven, said calk having the upper edge thereof sharpened or beveled, as at 9. The lower dove-tailed edge of the calk is provided with two transverse slots 10 equally spaced relatively to the ends of the calk and adapted to extend through said slots are screws 11 having heads 12. The screws 11 are adapted to extend through the inner wall 6 and screw into the outer wall 6, whereby when the heads 12 of the screws engage the inner walls 6, said walls will be drawn to snugly and frictionally engage the sides of the calk 8, not only preventing vertical displacement of said calk but longitudinal displacement as well.

The holder has the ends thereof provided with rearward extensions 13 that are enlarged and apertured, as at 14 to receive screw bolts 15 or other fastening means. The screw bolts enter openings or sockets 16 provided therefor in the horseshoe and in addition to these screw bolts, other screws 17 are employed, these screws being mounted in openings 18 provided therefor in the bottom of the holder and screw into openings 19 provided therefor in the horseshoe.

In lieu of the sharp calk 8 which has been particularly designed for winter, the calk shown in Fig. 5 can be placed in the holder and used in the summer, this "summer" calk having a dull or flattened edge 20 and a dove-tailed lower edge provided with slots 22 to clear the screw bolts 11.

After the holder has been secured to a shoe, it remains in engagement therewith until it is necessary to renew the holder. To exchange the calks or remove them for sharpening or other purposes, it is only necessary to remove the screw bolts 11 and pry the calks out of the holders. The screw bolts 11 in compressing or drawing together the side walls 6 of the holder insure a positive connection between the calk and the holder, besides affording means whereby the calk can be quickly removed. The holder and calk thereof are made of strong and durable metal and can be made of various sizes.

What I claim is:—

The combination with a horseshoe, of a toe calk, comprising a holder having longitudinal walls providing a dove-tailed tapering groove from one end of said holder to the opposite end thereof, a calk slidably mounted in the groove of said holder and having the lower edge thereof provided with transverse slots, means extending through one of the walls of said holder and the slots of said calk and engaging the opposite wall of said holder for drawing the walls of the holder together to grip the calk, hold-fast devices extending downwardly through said holder and engaging said shoe, extensions carried by the ends of said holder, and hold-fast devices adapted to extend through said extensions and engage in said shoe, substantially as described.

In testimony whereof I affix my signature in the presence of two witnesses.

JACOB GRABB.

Witnesses:
 Jos. ALTMAYER,
 C. M. GRUBBS.

---

Copies of this patent may be obtained for five cents each, by addressing the "Commissioner of Patents, Washington, D. C."